United States Patent [19]
Schneider

[11] 3,727,194
[45] Apr. 10, 1973

[54] NON-DESTRUCTIVE READOUT OF A COLOR CENTER MEMORY BY USING INFRARED ILLUMINATION

[76] Inventor: Irwin Schneider, 2402 Daphne Lane, Alexandria, Va. 22306

[22] Filed: Dec. 24, 1970

[21] Appl. No.: 101,400

Related U.S. Application Data

[63] Continuation-in-part of Ser. No. 708,299, Feb. 26, 1968, Pat. No. 3,580,688.

[52] U.S. Cl...........340/173 CC, 350/154, 350/160 R
[51] Int. Cl......G11c 13/02, G11c 13/04, G02b 27/28
[58] Field of Search................340/173 CC; 350/154, 350/160 R

[56] References Cited

UNITED STATES PATENTS

| | | | |
|---|---|---|---|
| 3,253,497 | 5/1966 | Dreyer | 340/173 CC |
| 3,466,616 | 9/1969 | Bron | 340/173 CC |

OTHER PUBLICATIONS

Okamoto, Optical Absorption of M Centers in Potassium Chloride Crystals, Nov. 15, 1961, Physical Review, Volume 124, No. 4, pp. 1090–1097

*Primary Examiner*—Bernard Konick
*Assistant Examiner*—Stuart Hecker
*Attorney*—R. S. Sciascia and Arthur L. Branning

[57] ABSTRACT

A method of information storage and retrieval in optical memory systems requiring only one highly focussed excitation source. M or $M_A$ color centers in alkali halide memory elements are reoriented by optical means along discrete lattice directions for writing or erasing binary information in predetermined portions of the memory elements. By subjecting the memory element to intense unfocussed infrared light during interrogation, readout is accomplished with the same optical means without destruction of the stored information.

13 Claims, No Drawings

NON-DESTRUCTIVE READOUT OF A COLOR CENTER MEMORY BY USING INFRARED ILLUMINATION

CROSS REFERENCE TO RELATED APPLICATIONS

This application is a continuation-in-part of application Ser. No. 708,299 filed Feb. 26, 1968, now U.S. Pat. No. 3,580,688.

STATEMENT OF GOVERNMENT INTEREST

The invention described herein may be manufactured by or for the Government of the United States of America for governmental purposes without the payment of any royalties thereon or therefor.

BACKGROUND OF THE INVENTION

1. Field of the Invention

This invention relates to information storage in alkali halide memory elements. More particularly it relates to techniques for utilizing the anisotropic properties of color centers in alkali halide crystals in the establishment of information states and the retrieval thereof.

2. Description of the Prior Art

With the ever expanding use of computers in data processing and related areas, it is becoming increasingly imperative to improve and refine the manner of storing and retrieving information. By making use of color centers in alkali halide crystals, and in particular the anisotropic physical properties thereof, greater storage capacities may be obtained in less space than in the commonly used ferromagnetic systems. In systems using photochromic materials, binary information is usually related to the presence or absence of a color center with its associated absorption bands. To be most practical, however, the photochemical conversion processes should be completely reversible and be capable of an optical readout which does not affect the stored information. These conditions greatly limit the number of centers which can actually be used.

The situation was improved with the processes described by Bron et al in U.S. Pat. No. 3,466,616 and in U.S. application Ser. No. 708,299, by the present inventor, wherein instead of changing the concentration of the centers, the alignment of color centers relative to the crystal axes was changed. The information state of the crystal was determined by optically detecting the state of alignment of the color centers within the crystal and relating this state to binary digits.

A practical disadvantage with any of the abovementioned systems was that they involve guiding of two distinct highly focused light beams to identical segments of a memory crystal. The technical requirements of such a system could be a major obstacle to the implementation of photochromic memory elements in computer devices.

OBJECTS OF THE INVENTION

It is, therefore, an object of the present invention to provide a novel method of information storage requiring only one guided focused excitation source for use in conjunction with the anisotropic properties of color centers in photochromic memory elements.

It is a further object of the present invention to provide a method of information storage with alkali halide memory elements having dichroic defects whereby only one guided and focused excitation light source is needed for writing, erasing and reading.

It is another object of the present invention to provide a novel technique for obtaining a nondestructive readout operation when utilizing a focused light source of an identical wavelength for writing, erasing and reading information in an alkali halide memory element.

An additional object of the present invention is to provide a simplified information storage system which requires only one guided focused excitation source for reading, writing, and erasing and one static unfocused excitation source for effecting a nondestructive readout.

A still further object of the present invention is to provide a method of increasing the reorientation efficiency of dichroic defects whose mechanism for reorientation involves prior ionization.

Still other objects, features and attendant advantages of the present invention will become apparent to those skilled in the art from a reading of the following summary, explanation of the atomic mechanisms, and description of a preferred embodiment.

SUMMARY OF THE INVENTION

In accordance with the present invention, there is provided a novel technique for simplifying and greatly enhancing the use of photochromic memory elements containing dichroic defects in computer information storage systems. After having written-in information by aligning the color centers in the memory element with a single wavelength light source, as described in the aforementioned U.S. Pat. No. 3,466,616 and U.S. application Ser. No. 708,299, the information may now be read with the same light source, without destruction or bleaching of the stored information. This is done by exposing the memory element to infrared radiation simultaneously with the read operation. By exposing the entire element with infrared excitation during readout, or at least the region being interrogated, only one light source need be focused and guided to each information storage site. Since the potential storage capacity of alkali crystals is limited to bit sites which are about the dimensions of the wavelength of the light used for reading, one may achieve densities of the order of $10^8$ bits/cm$^2$. Since this far exceeds the storage capacity of conventional elements, the significance of the present discovery is readily apparent. Furthermore, the infrared light does not in any way alter the alignment of color centers and therefore does not destroy the stored information.

DESCRIPTION OF THE PREFERRED EMBODIMENT

As described in the parent copending U.S. application Ser. No. 708,299 filed Feb. 26, 1968 by the present inventor, various types of color centers present in alkali halide crystals may be utilized as optical memory devices. Information, such as the binary digits Zero and One used in computers, is related to the alignment of the color centers within the memory crystals. Information is stored by aligning the color centers along predetermined directions and subsequently detecting such alignment for information readout. The present invention is an improvement over Ser. No. 708,299 in that it requires only a single focused light means for storing and retrieving information in photochromic memory elements.

Color centers that are useful in the present invention are M centers described in U.S. Pat. No. 3,466,616, which is hereby incorporated by reference, and the $M_A$ centers described in parent copending case U.S. application Ser. No. 708,299. The M center consists of two nearest-neighbor F centers (each F center consists of an electron trapped at a negative ion vacancy) and has three symmetry axes along which its optical dipole elements lie. One is the crystal diagonal <110> vacancy axis. This is also the direction for an optical dipole moment of the so-called M band. In KCl, for example, this absorption lies at around 800 nm. The M center also has a number of weaker absorptions in the spectral region between 400 and 600 nm. The moments for these lie along the <110> and the <100> directions perpendicular to the vacancy axis. At low temperatures, the M center can be aligned most efficiently with polarized light having a wavelength of about 500 nm.

The $M_A$ centers, which are particularly preferred because they are more stable than M centers, each consist of an M center lying next to an impurity ion in the crystal. The absorption of the $M_A$ center corresponding to the M band, (i.e. — that corresponding to a dipole moment along its vacancy axis, has a peak wavelength of about 820 nm. It also has absorptions with properties similar to those of the M center in the region of 400–620 nm. Generally, at temperatures below 250°K, one can align essentially all $M_A$ centers along a single lattice direction using polarized light.

The M and $M_A$ centers can be produced in alkali halide crystals by known prior art techniques such as heating the crystal in the vapor of an alkali metal to produce F centers and then optically exciting F center motion so that they migrate and combine into M and $M_A$ centers. By increasing the concentration of impurity defects in the crystal, the writing efficiency, i.e., the reorientation efficiency, can be effectively improved because of the resulting increase in $M^+$ or $M_A{}^+$ absorptions. A preferred crystal in KCl which can be grown by the well-known Kyropolous technique and colored additively. Impurity ions for the $M_A$ centers are commonly sodium and lithium.

It has recently been discovered (Schneider, I., Phys. Rev. Letters 24, 1296, 1970, which is hereby incorporated by reference) that M centers reorient optically during de-excitation from their ionized $M^+$ state rather than from a state of the M center. It has also been discovered that $M_A$ centers reorient optically at low temperatures, but predominately through thermal activation at higher temperatures (Schneider, I., Solid State Communications Vol 9, No. 1 1971). Representative equations for the reorientation transformations involved are:

$$M \xrightarrow{h\nu_M} e + M^+ \quad (1)$$

$$e + F \longrightarrow F' \quad (2)$$

$$M^+ \xrightarrow{h\nu_M} (M^+)_R \quad (3)$$

$$F' \xrightarrow{h\nu_M} e + F \quad (4)$$

$$e + (M^+)_R \longrightarrow (M)_R \quad (5)$$

The $M$ center absorbs light, $h\nu_M$, and is ionized (1), with the $M$-center electron becoming trapped by an $F$-center as an $F'$-center (2). Next, the ionized $M$center or $M^+$ center absorbs light and is reoriented (3). Finally, the $F'$-center absorbs light and is bleached (4) and the electron is recaptured by the reoriented $M^+$-center forming the reoriented $M$-center (5). The above mechanisms are also applicable to $M_A$-centers.

For the above mechanisms, the same excitation light is responsible for first producing $M^+$-centers through light absorption in higher states of the $M^+$-center, and finally converting reoriented $M^+$-centers to $M$-centers through light absorption by $F'$-centers. For both $M^+$- and $M_A{}^+$-center reorientations, the wavelength of the exciting light which is effective in all the aforementioned processes should lie roughly between 450 to 550 nm. With the above described mechanism, the formation of relatively large $M^+$ (*or* $M_A{}^+$) center concentrations and the subsequent reorientation of $M$ (or $M_A$) centers can be inhibited by bleaching $F'$ centers with an auxiliary light source in the $F'$ absorption band. This effectively bleaches the centers which trap the $M$ (or $M_A$) electrons. By exposing the memory crystal (or at least the region containing the information bit) to $F'$ band light during the readout process, the stored information, i.e. the state of $M$ (or $M_A$) center alignment is not altered. Thus, a process results which requires only one guided focused excitation light source. For $M$ centers in KCl, these processes occur most efficiently as described at temperatures of 250°K to 40°K, and with excitation light having wavelengths between 450–550 nm. For $M_A$ centers in KCl, the temperature range would be from 125°K to 4°K and with the light wavelength range between 450 to 550 nm. At temperatures from 125° to 250°K, $M_A{}^+$ centers thermally reorient so that equation (3) above is no longer necessary.

The wavelength of the $F'$ band auxiliary light may range anywhere from 600 to 1300 nm and should be intense enough to inhibit substantially all $M$ or $M_A$ center reorientation during interrogation of the bit. It should be noted that practically, the chief advantage of the present invention is that the auxiliary light need not be focused and may expose the whole memory element at the appropriate times. However, it is only essential that the bit that is being interrogated be exposed.

The ability to suppress $M$ or $M_A$ center reorientation with $F'$ excitation is analogous to saying that the $M$ or $M_A$ center reorientation efficiency is proportional to the $M^+$ or $M_A{}^+$ concentration. (Note the aforementioned Phys. Rev. Letters article). In crystals in which the $F$ center is the principal electron trap, this efficiency is reduced by bleaching $F'$ centers and this would effectively increase the intensity for reaction equation (4). Conversely, the efficiency can be enhanced by preparing crystals with relatively large $F$ center concentrations. This effect may be generalized so that the principal electron trap is any other type of defect or impurity center which has corresponding absorptions which, when excited with light, can be bleached resulting in reduced $M$ center reorientation efficiencies. The reaction equations would be similar with X, a generalized defect, replacing $F$, and with X' replacing $F'$. Thus, the efficiency during the read operation can be reduced, resulting in an effective nondestructive readout, by bleaching these absorptions. Conversely, the efficiency during the write-erase operations can be enhanced by the presence of these additional defect or impurity absorptions because this could effectively increase the magnitude of the $M^+$ (or $M_A{}^+$) absorption.

For illustrative purposes, an information storage technique may be that described in Ser. No. 708,299 whereby all the $M_A$ color centers within the memory crystal are aligned by illumination with polarized light of 450–550 nm wavelength. Information is then stored or written-in by rotating the 450–550 nm polarized light 90° and illuminating only predetermined portions of the crystal so that selected color centers become aligned along a direction perpendicular to the original alignment. The stored information can then be erased or bleached by reexposing the same portions of the element with light of the initial polarization. To attain a nondestructive readout, the memory element is now illuminated with an intense auxiliary light, such as a tungsten lamp, having a wavelength in the near infrared region while the stored information is being interrogated with the same 450–550 nm light that was used for write-in — thereby obviating the necessity of another focused light source at a different wavelength as is required by the prior art. The same technique may be carried out with $M$ centers also using 450–550 nm excitation light.

In an alternative technique, the original alignment step may be eliminated and information may be written into a randomly oriented crystalline region. Other methods or storing and retrieving information that can be simplified and improved with the present invention are those disclosed in U.S. Pat. No. 3,466,616.

The information readout may be accomplished by known prior techniques such as measuring the amount of interrogation light transmitted as shown in U.S. Pat. No. 3,466,616 or by detecting the emission of light from the memory crystal caused by the interrogation light as discussed in parent U.S. Pat. application Ser. No. 708,299.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of information storage and retrieval in optical memory systems using photochromic materials containing color centers comprising:

storing information by aligning said color centers along discrete lattice directions with an excitation means of a predetermined wavelength; and retrieving information non-destructively by interrogating said aligned color centers with said excitation means while simultaneously exposing at least that portion of said material containing said aligned color centers with infrared radiation, said infrared radiation being of a different wavelength than said predetermined wavelength.

2. The method of claim 1 including the step of erasing said stored information by interrogating said aligned color centers with said excitation means.

3. The method of claim 1 including the step of aligning said color centers in a common direction prior to storing information.

4. The method of claim 1 wherein said photochromic material is potassium chloride and said color centers are $M_A$ centers.

5. The method of claim 1 wherein said photochromic material is potassium chloride and said color centers are $M$ centers.

6. A method of storing and retrieving information in alkali halide memory elements having color centers comprising:

selectively illuminating at least part of said element with a polarized light of a predetermined wavelength to cause said color centers to become aligned in a common direction to represent stored information; and, illuminating at least said part of said element with said polarized light to non-destructively determine the information state thereof while simultaneously illuminating at least said part with light of infrared wavelength, said infrared wavelength being different than said predetermined wavelength.

7. The method of claim 6 including the step of aligning said color centers in a common direction prior to storing information.

8. The method of claim 6 including the step of erasing said stored information by interrogating said aligned color centers with said excitation means.

9. The method of claim 6 wherein said memory elements comprise potassium chloride and said color centers are $M_A$ centers.

10. The method of claim 6 wherein said memory elements comprise potassium chloride and said color centers are $M$ centers.

11. The method of claim 6 wherein said memory elements contain crystalline impurity defects with electron trapping properties which allow an increase in the concentration of ionized dichroic defects.

12. The method of claim 11 wherein said ionized dichroic defects are $M_A{}^+$ centers.

13. The method of claim 11 wherein said ionized dichroic defects are $M^+$ centers.

* * * * *